United States Patent
Bahrami Ziarani et al.

(10) Patent No.: US 9,599,179 B2
(45) Date of Patent: Mar. 21, 2017

(54) BRAKE LINING MONITORING SYSTEM DISPLAYING A MEASURED THICKNESS OF BRAKE LINING

(76) Inventors: Mehrzad Bahrami Ziarani, Ghazvin (IR); Mehran Bahrami Ziarani, Ghazvin (IR)

(*) Notice: Subject to any disclaimer, the term of this patent is extended or adjusted under 35 U.S.C. 154(b) by 316 days.

(21) Appl. No.: 13/031,268

(22) Filed: Feb. 21, 2011

(65) Prior Publication Data
US 2012/0212335 A1    Aug. 23, 2012

(51) Int. Cl.
*G08B 21/00* (2006.01)
*F16D 66/02* (2006.01)

(52) U.S. Cl.
CPC .................. *F16D 66/026* (2013.01)

(58) Field of Classification Search
USPC ............ 340/438, 439, 453, 454, 457; 188/1.11 W, 1.11 L, 1.11 E
See application file for complete search history.

(56) References Cited

U.S. PATENT DOCUMENTS

2002/0195298 A1 * 12/2002 Borugian ............ 188/1.11 W

* cited by examiner

*Primary Examiner* — Jeffery Hofsass
(74) *Attorney, Agent, or Firm* — Barry Choobin; Patent 360 LLC

(57) ABSTRACT

A brake lining monitoring system comprising primarily for automobiles. The monitoring system comprises a sensor for continuously measuring the thickness of a brake lining disposed at each wheel of an automobile, a memory including a plurality of predefined successive thickness value ranges wherein, each thickness value range is associated with a brake lining status message, and a display monitor for displaying the measured thickness value along with the status message associated with the thickness value range to which the measured thickness value corresponds.

14 Claims, 4 Drawing Sheets

| BRAKE LINING STATUS INDICATOR ||||  ~12 |
|---|---|---|---|
| FRONT LEFT | FRONT RIGHT | REAR LEFT 26 | REAR RIGHT |
| INITIAL THICKNESS 20 | REMAINING THICKNESS 18 | PERCENTAGE REMAINING 22 | STATUS 24 |
| 9.75 | 3.24 | 33% | BAD |

| BRAKE LINING STATUS INDICATOR | | | | 12 |
|---|---|---|---|---|
| FRONT LEFT | FRONT RIGHT 26 | REAR LEFT | REAR RIGHT | |
| INITIAL THICKNESS 20 | REMAINING THICKNESS 18 | PERCENTAGE REMAINING 22 | STATUS 24 | |
| 97.8 | 6.33 | 64% | NORMAL | |

*FIG. 3*

| BRAKE LINING STATUS INDICATOR ||||  ~12
|---|---|---|---|
| FRONT LEFT | FRONT RIGHT | REAR LEFT 26 | REAR RIGHT |
| INITIAL THICKNESS 20 | REMAINING THICKNESS 18 | PERCENTAGE REMAINING 22 | STATUS 24 |
| 9.75 | 3.24 | 33% | BAD |

*FIG. 4*

BRAKE LINING MONITORING SYSTEM DISPLAYING A MEASURED THICKNESS OF BRAKE LINING

BACKGROUND

Technical Field

This invention relates to automobile brake systems, automobile indicator systems, and more particularly to a brake lining monitoring system for automobiles.

Brake linings are instrumental in automobile brake systems. Brake linings, which are a part of brake pad or brake shoe, are consumable surfaces composed of relatively softer but tough and heat resistant material mounted to a solid metal backing Due to repeated braking applications, brake linings are subjected to abrasion and thus needs to be replaced over time. The task of replacing of brake linings is easier said than done. This is because they need to be periodically and carefully inspected for excessive wear. In order to alert a driver of an automobile of an impending brake lining replacement, usually, a metal tang, which is also known as wear indicator, is incorporated into brake pads. As a result of this, when a brake is applied at a stage where the brake linings are worn out, a loud annoying squeal is produced due to the contact between the metal tang and the disc of the automobile.

SUMMARY

The present invention—brake lining monitoring system—presents a sophisticated alternative way of alerting a driver of an impending brake lining replacement as opposed to the abovementioned technique. The monitoring system employs a sensor for measuring the thickness of brake lining and a display monitor for displaying the measured thickness value. The monitoring system further comprises a memory which includes a plurality of predefined successive thickness value ranges, each of which is associated with a brake lining status message. The monitor also displays the status message of the thickness value range within which the thickness value falls. The monitoring system is designed such that an auditory alarm is issued if the displayed thickness value corresponds to a lowest thickness value range.

The other objects and advantages of the embodiments herein will become readily apparent from the following detailed description taken in conjunction with the accompanying drawings.

BRIEF DESCRIPTION OF THE DRAWINGS

FIGS. 2 through 4 represent screenshots of brake lining status indicator for front right, front left, and rear right wheels of the automobile respectively.

FIGURES—REFERENCE NUMERALS

10 . . . Processor
12 . . . Display Monitor
14 . . . Brake Pad
16 . . . Automobile
18 . . . "REMAINING THICKNESS"
20 . . . "INITIAL THICKNESS"
22 . . . "PERCENTAGE REMAINING"
24 . . . "STATUS"
26 . . . Tab
28 . . . Alarm Light
30 . . . Speaker

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
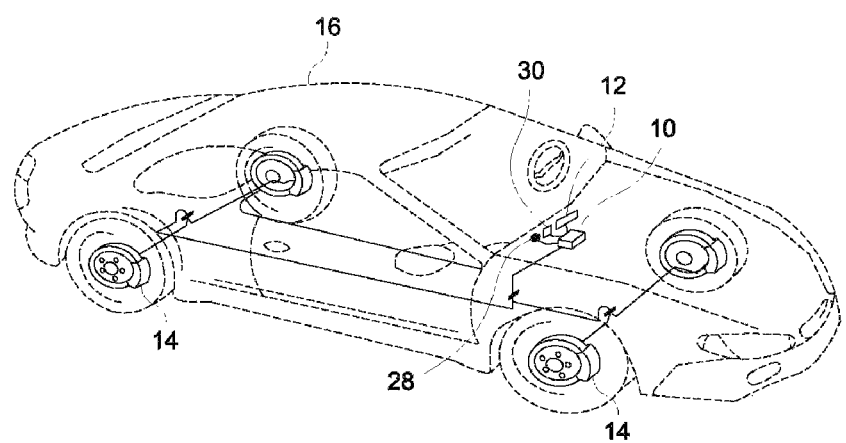
FIG. 1 is an illustration of the brake lining monitoring system incorporated into an automobile.

Referring to FIG. 1, the present invention is a brake lining monitoring system designed primarily for automobiles. The monitoring system comprises a plurality of sensors, a memory, a processor 10, and a display monitor 12. Each of the sensors is associated with each of the brake pads 14 of an automobile 16. The sensor is designed such that it is sensitive to a 0.001 millimeter change in the thickness of the brake lining. The sensor is covered in a case preferably made of metal or hard plastic for protection against dust, water, and etc.

The memory of the monitoring system includes a total thickness value of each brake lining and three predetermined successive brake lining thickness value ranges viz., higher, mid, and lower thickness value ranges. The higher, mid, and lower thickness value ranges are associated with "desirable", "normal", and "bad" brake lining status messages respectively.

Figure 2:
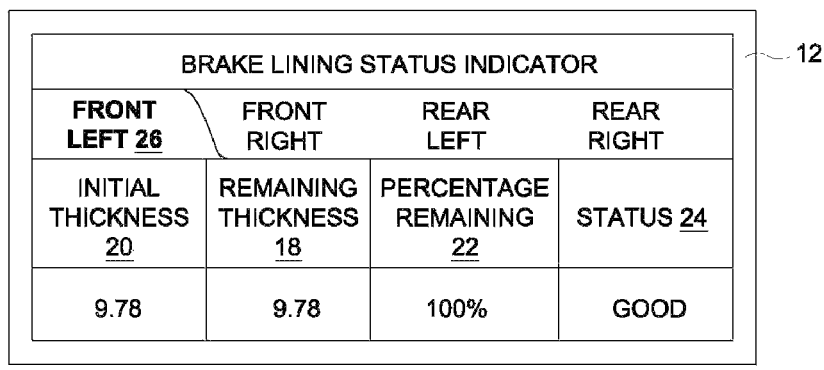

Referring to FIGS. 2 through 4, the sensor measures the thicknesses of the brake lining in a form native thereof, and transmits the same to the processor 10 (FIG. 1). The processor 10, in turn, enables the output from the sensor to be displayed on the monitor 12 in a legible form under the heading—"REMAINING THICKNESS" 18. The initial or total thickness value of the brake lining is displayed under heading—"INITIAL THICKNESS" 20. The measured thickness value is also displayed as a percentage of the initial thickness value displayed under the heading—"PERCENTAGE REMAINING" 22. Most importantly, a status message is also displayed under the heading—"STATUS" 24 along with the rest of the values or readings wherein, the status message pertains to a thickness value range to which the measured thickness value corresponds. In another embodiment, the processor, based on an algorithm, displays a ballpark figure of the mileage that the thickness value—"REMAINING THICKNESS" 18—can afford. Four tabs 26 are provided wherein each corresponds to each brake lining of the automobile. The monitor 12 is preferably an LCD screen located on the dashboard of the automobile.

Referring to FIGS. 1 through 4, the monitoring system further comprises an alarm light 28 associated with the processor 10. The alarm light 28 is coupled to a speaker 30 as shown in FIG. 1. The alarm light 28 and the speaker 30 are simultaneously activated when the "STATUS" 24 pertaining to a brake lining of the automobile reads "bad," for instance, as shown in FIG. 4. A deactivation button is provided on the dashboard which, when pressed, deactivates the alarm light and the speaker. In another embodiment, the processor 10 is associated with the media player of the automobile 16 such that the volume of the audio output from the media player is temporarily reduced to a predetermined decibel level in order for the output from the speaker to be heard.

In another embodiment, the processor is associated with the electric valve of the automobile 16 located in the fuel path such that the speed of the automobile 16 cannot exceed a predefined limit when the "STATUS" 24 of a brake lining reads "bad," for instance, as shown in FIG. 4

Although the embodiment herein is described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A brake lining monitoring system comprising:
   (a) a plurality of sensors each disposed at each wheel of an automobile, each sensor for measuring the thickness of a brake lining disposed at each wheel;
   (b) a memory including a plurality of predefined successive brake lining thickness value ranges wherein, each thickness value range is associated with a brake lining status message; and
   (c) a means for displaying the measured thickness values, each thickness value displayed along with the status message associated with a thickness value range to which that thickness value corresponds.

2. The monitoring system of claim 1 wherein, the displaying means comprises an LCD display monitor disposed on the dashboard of the automobile.

3. The monitoring system of claim 1 wherein, the plurality of thickness value ranges comprises high, mid, and low thickness value ranges.

4. The monitoring system of claim 3 wherein, the high, mid, and low thickness value ranges are associated with "desirable", "normal", and "bad" status messages respectively.

5. The monitoring system of claim 4 further comprising an alarm light that activates when the status message reads "bad."

6. The monitoring system of claim 5 further comprising a speaker that activates when the status message reads "bad;" the speaker coupled with the alarm light such that the both the alarm light and the speaker are activated simultaneously.

7. The monitoring system of claim 6 associated with a media player of the automobile such that the volume of the audio output from the media player is temporarily reduced to a predetermined decibel level when speaker is activated so as to make the message from the speaker audible.

8. The monitoring system of claim 4 associated with an electric valve of the automobile such that the speed of the automobile cannot exceed a predefined limit when the status message reads "bad."

9. The monitoring system of claim 1 wherein, the displaying means further displays each thickness value as a percentage of an initial thickness value of the corresponding brake lining; the initial thickness value for each brake lining stored in the memory.

10. The monitoring system of claim 1 wherein, the displaying means further displays a ballpark figure of the mileage each thickness value can afford.

11. The monitoring system of claim 1 wherein, each sensor is sensitive to a 0.001 millimeter change in the thickness of the respective brake lining.

12. The monitoring system of claim 1 wherein, each sensor is covered in a case for protection against the dust, water, and the like.

13. The monitoring system of claim 1 wherein, the activity of each sensor is continuous.

14. A brake lining monitoring system comprising:
   (a) a plurality of sensors each disposed at each wheel of an automobile, each sensor for continuously measuring the thickness of a brake lining disposed at each wheel;
   (b) a memory comprising a plurality of predefined successive brake lining thickness value ranges, viz., higher, mid, and lower thickness value ranges associated with "good", "normal", and "bad" brake lining status messages respectively;
   (c) a means for displaying the measured thickness values wherein, each thickness value is displayed along with the status message associated with a thickness value range to which that thickness value corresponds;
   (d) an alarm light for alerting the driver when the status message reads "bad;" and
   (e) a speaker for alerting the driver of the automobile when the status message reads "bad," the speaker coupled with the alarm light.

* * * * *